(12) United States Patent
Chang et al.

(10) Patent No.: US 11,228,613 B2
(45) Date of Patent: Jan. 18, 2022

(54) ADAPTIVE ADJUSTMENT USING SENSOR DATA AND DISTRIBUTED DATA

(71) Applicant: International Business Machines Corporation, Armonk, NY (US)

(72) Inventors: Hung-Yang Chang, Scarsdale, NY (US); Ching-Hua Chen, New York, NY (US); James V. Codella, Danbury, CT (US); Pei-Yun Hsueh, New York, NY (US); Xinyu Hu, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1035 days.

(21) Appl. No.: 15/601,029

(22) Filed: May 22, 2017

(65) Prior Publication Data

US 2018/0336480 A1   Nov. 22, 2018

(51) Int. Cl.
| | | |
|---|---|---|
| H04L 29/06 | (2006.01) |
| G06N 20/00 | (2019.01) |
| G06F 16/25 | (2019.01) |
| G06N 3/00 | (2006.01) |
| G06N 5/00 | (2006.01) |

(Continued)

(52) U.S. Cl.
CPC ............ *H04L 63/20* (2013.01); *G06F 16/252* (2019.01); *G06N 3/006* (2013.01); *G06N 5/00* (2013.01); *G06N 20/00* (2019.01); *G06F 16/90335* (2019.01); *G06N 3/126* (2013.01)

(58) Field of Classification Search
CPC ...................................................... G06N 20/00
USPC ........................................................... 706/11
See application file for complete search history.

(56) References Cited

U.S. PATENT DOCUMENTS

| | | |
|---|---|---|
| 8,630,723 B2 | 1/2014 | Prieler et al. |
| 8,764,651 B2 | 7/2014 | Tran |
| 8,838,513 B2 | 9/2014 | Sudharsan |

(Continued)

FOREIGN PATENT DOCUMENTS

| | | |
|---|---|---|
| CN | 104223611 | 12/2014 |
| CN | 105045713 | 11/2015 |

(Continued)

OTHER PUBLICATIONS

Zhao Y, Kosorok MR, Zeng D. Reinforcement learning design for cancer clinical trials. Stat Med. Nov. 20, 2009;28(26):3294-315. doi: 10.1002/sim.3720. PMID: 19750510; PMCID: PMC2767418. (Year: 2009).*

(Continued)

*Primary Examiner* — James D. Rutten
(74) *Attorney, Agent, or Firm* — Cantor Colburn LLP; Kristofer Haggerty

(57) ABSTRACT

An aspect includes querying, by a processor, a plurality of model data from a distributed data source based at least in part on one or more user characteristics. A plurality of sensor data is gathered associated with a condition of a user. A policy is generated including an end goal and one or more sub-goals based at least in part on the model data and the sensor data. The policy is iteratively adapted based at least in part on one or more detected changes in the sensor data collected over a period of time to adjust at least one of the one or more sub-goals. The policy and the one or more sub-goals are provided to the user.

25 Claims, 9 Drawing Sheets

(51) Int. Cl.
  *G06F 16/903* (2019.01)
  *G06N 3/12* (2006.01)

(56) References Cited

U.S. PATENT DOCUMENTS

| | | | | |
|---|---|---|---|---|
| 9,764,162 | B1* | 9/2017 | Willcut | A61B 6/5223 |
| 2004/0247748 | A1 | 12/2004 | Bronkema | |
| 2007/0072156 | A1 | 3/2007 | Kaufman et al. | |
| 2007/0219059 | A1 | 9/2007 | Schwartz et al. | |
| 2008/0126277 | A1* | 5/2008 | Williams | G09B 19/00 |
| | | | | 706/14 |
| 2010/0331146 | A1 | 12/2010 | Kil | |
| 2011/0301974 | A1 | 12/2011 | Tashiro et al. | |
| 2013/0209971 | A1 | 8/2013 | Luecke | |
| 2013/0226846 | A1* | 8/2013 | Li | G06F 40/295 |
| | | | | 706/12 |
| 2014/0067730 | A1* | 3/2014 | Kozloski | G06N 7/005 |
| | | | | 706/12 |
| 2015/0025903 | A1 | 1/2015 | Mueller-Wolf | |
| 2015/0121216 | A1* | 4/2015 | Brown | G06N 3/008 |
| | | | | 715/707 |
| 2015/0193687 | A1 | 7/2015 | Park et al. | |
| 2017/0220751 | A1* | 8/2017 | Davis | A61B 5/14503 |
| 2017/0286621 | A1* | 10/2017 | Cox | G06F 19/3481 |
| 2018/0025274 | A1* | 1/2018 | Beller | G06F 16/90335 |
| | | | | 706/46 |
| 2018/0107943 | A1* | 4/2018 | White | A61B 5/486 |
| 2018/0218171 | A1* | 8/2018 | Bellala | G06F 21/602 |

FOREIGN PATENT DOCUMENTS

| | | |
|---|---|---|
| CN | 105183091 | 12/2015 |
| CN | 105320533 | 2/2016 |
| EP | 0726005 | 8/1996 |

OTHER PUBLICATIONS

Xu, B., Qin, T., Qiu, G., & Liu, T. Y. (2015, June). Optimal pricing for the competitive and evolutionary cloud market. In Twenty-Fourth International Joint Conference on Artificial Intelligence. (Year: 2015).*

Liu, Y., Wang, Y., Kosorok, M. R., Zhao, Y., &Zeng, D. (Nov. 7, 2016). Robust hybrid learning for estimating personalized dynamic treatment regimens. arXiv preprint arXiv:1611.02314. (Year: 2016).*

Rashka, "Machine Learning FAQ" Mar. 19, 2016, sebastianraschka. com, archived at <web.archive.org/web/20160319111223/https://sebastianraschka.com/faq/docs/parametric_vs_nonparametric.html> (Year: 2016).*

A. Mosenia, S. Sur-Kolay, A. Raghunathan and N. K. Jha, "Wearable Medical Sensor-Based System Design: A Survey," in IEEE Transactions on Multi-Scale Computing Systems, vol. 3, No. 2, pp. 124-138, Apr. 1-Jun. 2017, doi: 10.1109/TMSCS.2017.2675888. (Year: 2017).*

B. Zhang, et al., "Estimating Optimal Treatment Regimes from Classification Perspective," Statistics Jan. 1, 2012, pp. 103-114.

H. Bang, "Doubly Robust Estimation in Missing Data and Causal Inference Models," Biometrics (Dec. 2005), pp. 962-973.

IP.com: A Personalized Temperature Adjusting System and Method, Disclosed Anonymously, Dec. 6, 2013, 4 pages.

IP.com: A Policy-controlled Adaptive Platform for Querying Real-time SmartPhone Data, Disclosed Anonymously, Jun. 26, 2013, 10 pages.

IP.com: Method and Apparatus for Trust, Vicinity, Natural Language Processing Based Collaboration Leveraging Insights-Based Cognitive Models, Disclosed Anonymously, Apr. 21, 2015, 5 pages.

J.M. Robins, "Marginal Structural Models and Causal Inference in Epidemiology," Epidemiology, vol. 11, No. 5 (Sep. 2000), pp. 550-560.

M. Qian, et al., "Performance Guarantees for Individualized Treatment Rules," Annals of Statistics, vol. 39, No. 2 (2011), pp. 1180-1210.

S.A. Murphy, "Optimal Dynamic Treatment Regimes," Journal of the Roayl Statistical Society, Series B (Statistical Methodology) vol. 2 (2003), pp. 331-355.

Williamson, "Algorithmic skin: health-tracking technologies, personal analytics and the biopedagogies of digitized health and physical education," Sport, Education and Society, 2015, vol. 20, No. 1, pp. 133-151, http://dx.doi.org/10.1080/13573322.2014.962494.

Y. Zhang, et al., "Using Decision Lists to Construct Interpretable and Parsimonious Treatment Regimes," Biometrics vol. 4, Dec. 2015, pp. 895-904.

International Application No. PCT/IB2017/058255 International Search Report and Written Opinion dated Apr. 28, 2018, 9 pages.

* cited by examiner

ADAPTIVE ADJUSTMENT USING SENSOR DATA AND DISTRIBUTED DATA

BACKGROUND

The present invention generally relates to computer technology, and more specifically, to an adaptive adjustment system using sensor data and distributed data.

Computer technology used to develop plans and track progress toward completing a plan are often rigid in structure. Planning systems typically use data collection, often manually populated, to compare against an ideal linear advancement from a baseline to an end goal. When users of the plan have a setback or an event that deviates from the ideal trajectory of the plan, it can be challenging to get back on track to reach the end goal.

Using a rigid tracking system to recommend actions does not account for the current stage of activity that the user is experiencing and may or may not reflect paths that other users have taken to achieve similar goals. Further, to the extent that other user data is available, exchanging large amounts of user data across networks to support plan/policy development and tracking can result in processing and network burdens, particularly as the number of available data sets expands. Thus, challenges remain in efficiently accessing data for plan/policy development and tracking, as well as handling observed deviations from the plan/policy.

SUMMARY

Embodiments of the present invention are directed to a computer-implemented method. A non-limiting example of the computer-implemented method includes querying, by a processor, a plurality of model data from a distributed data source based at least in part on one or more user characteristics. A plurality of sensor data associated with a user condition is gathered. A policy is generated including an end goal and one or more sub-goals based at least in part on the model data and the sensor data. The policy is iteratively adapted based at least in part on one or more detected changes in the sensor data collected over a period of time to adjust at least one of the one or more sub-goals. The policy and the one or more sub-goals are provided to the user. The method adapts to deviations from the policy and selectively accesses data sources to dynamically modify aspects of the policy while efficiently managing sensor data and model data access and usage.

The computer-implemented method further includes determining a plurality of behavioral patterns of the user based at least in part on the one or more user characteristics and the sensor data. The behavioral patterns can assist in determining how to partition stages and sub-goals effectively for the user.

The computer-implemented method further includes where the one or more sub-goals include one or more personalized thresholds derived from the behavioral patterns. The personalized thresholds can provide checkpoints for determining whether an update to the policy is needed at various stages.

The computer-implemented method further includes using a table lookup or statistical functional approximation to determine a sequence of decision rules based at least in part on the one or more sub-goals and a confidence level indicating a likelihood of meeting the end goal using the sequence of decision rules. The confidence level can be used to determine whether the policy is acceptable or if additional data collection is needed to further refine the policy.

The computer-implemented method further includes comparing the confidence level to an acceptance threshold, searching for a plurality of additional actions between a capability of the user and a plurality of model actions from the model data based at least in part on determining that the confidence level does not meet the acceptance threshold, prompting the user to perform one or more of the additional actions, collecting a plurality of additional user data based at least in part on performance of the one or more of the additional actions by the user, and further adapting the policy based at least in part on the additional user data. Additional data collection for additional actions can assist in determining which model data more closely aligns with the capabilities and characteristics of the user in making policy adjustments.

The computer-implemented method further includes where iteratively adapting the policy includes performing an updated evaluation of the sensor data collected over the period of time in combination with a plurality of previously collected instances of the sensor data using statistical and reinforcement learning to classify the one or more detected changes. Reinforcement learning shapes the policy to meet sub-goals and output recommended actions.

The computer-implemented method further includes adjusting at least one sub-goal based at least in part on detecting that the user has exceeded or missed a previously determined instance of at least one of the one or more sub-goals. Constraining when policy updates are computed reduces processing and data access burdens while still providing opportunities to adjust for variations in intermediate results.

Embodiments of the present invention are directed to a system. A non-limiting example of the system includes a memory and a processor coupled with the memory. The processor is configured to query a plurality of model data from a distributed data source based at least in part on one or more user characteristics. A plurality of sensor data is gathered associated with a condition of a user. A policy is generated including an end goal and one or more sub-goals based at least in part on the model data and the sensor data. The policy is iteratively adapted based at least in part on one or more detected changes in the sensor data collected over a period of time to adjust at least one of the one or more sub-goals. The policy and the one or more sub-goals are provided to the user. The system adapts to deviations from the policy and selectively accesses data sources to dynamically modify aspects of the policy while efficiently managing sensor data and model data access and usage.

In one or more examples, the processor is further configured to determine a plurality of behavioral patterns of the user based at least in part on the one or more user characteristics and the sensor data, where the one or more sub-goals include one or more personalized thresholds derived from the behavioral patterns. The behavioral patterns can assist in determining how to partition stages and sub-goals effectively for the user. The personalized thresholds can provide checkpoints for determining whether an update to the policy is needed at various stages.

The processor is further configured to use a table lookup or statistical functional approximation to determine a sequence of decision rules based at least in part on the one or more sub-goals and a confidence level indicating a likelihood of meeting the end goal using the sequence of decision rules. The confidence level can be used to determine whether the policy is acceptable or if additional data collection is needed to further refine the policy.

The processor is further configured to compare the confidence level to an acceptance threshold, search for a plurality of additional actions between a capability of the user and a plurality of model actions from the model data based at least in part on determining that the confidence level does not meet the acceptance threshold, prompt the user to perform one or more of the additional actions, collect a plurality of additional user data based at least in part on performance of the one or more of the additional actions by the user, and further adapt the policy based at least in part on the additional user data. Additional data collection for additional actions can assist in determining which model data more closely aligns with the capabilities and characteristics of the user in making policy adjustments.

The processor is further configured to perform an updated evaluation of the sensor data collected over the period of time in combination with a plurality of previously collected instances of the sensor data using statistical and reinforcement learning to classify the one or more detected changes. Reinforcement learning shapes the policy to meet sub-goals and output recommended actions.

The processor is further configured to adjust at least one sub-goal based at least in part on detecting that the user has exceeded or missed a previously determined instance of at least one of the one or more sub-goals. Constraining when policy updates are computed reduces processing and data access burdens while still providing opportunities to adjust for variations in intermediate results.

Embodiments of the invention are directed to a computer program product including a computer readable storage medium having program instructions embodied therewith. The program instructions are executable by a processing circuit to cause the processing circuit to perform a method. A non-limiting example of the instructions cause the processing circuit to query a plurality of model data from a distributed data source based at least in part on one or more user characteristics. A plurality of sensor data is gathered associated with a condition of a user. A policy is generated including an end goal and one or more sub-goals based at least in part on the model data and the sensor data. The policy is iteratively adapted based at least in part on one or more detected changes in the sensor data collected over a period of time to adjust at least one of the one or more sub-goals. The policy and the one or more sub-goals are provided to the user. The program instructions adapt to deviations from the policy and selectively access data sources to dynamically modify aspects of the policy while efficiently managing sensor data and model data access and usage.

In one or more examples, the program instructions further cause the processing circuit to determine a plurality of behavioral patterns of the user based at least in part on the one or more user characteristics and the sensor data, where the one or more sub-goals include one or more personalized thresholds derived from the behavioral patterns. The behavioral patterns can assist in determining how to partition stages and sub-goals effectively for the user. The personalized thresholds can provide checkpoints for determining whether an update to the policy is needed at various stages.

The program instructions further cause the processing circuit to use a table lookup or statistical functional approximation to determine a sequence of decision rules based at least in part on the one or more sub-goals and a confidence level indicating a likelihood of meeting the end goal using the sequence of decision rules. The confidence level can be used to determine whether the policy is acceptable or if additional data collection is needed to further refine the policy.

The program instructions further cause the processing circuit to compare the confidence level to an acceptance threshold, search for a plurality of additional actions between a capability of the user and a plurality of model actions from the model data based at least in part on determining that the confidence level does not meet the acceptance threshold, prompt the user to perform one or more of the additional actions, collect a plurality of additional user data based at least in part on performance of the one or more of the additional actions by the user, and further adapt the policy based at least in part on the additional user data. Additional data collection for additional actions can assist in determining which model data more closely aligns with the capabilities and characteristics of the user in making policy adjustments.

The program instructions further cause the processing circuit to perform an updated evaluation of the sensor data collected over the period of time in combination with a plurality of previously collected instances of the sensor data using statistical and reinforcement learning to classify the one or more detected changes. Reinforcement learning shapes the policy to meet sub-goals and output recommended actions.

The program instructions further cause the processing circuit to adjust at least one sub-goal based at least in part on detecting that the user has exceeded or missed a previously determined instance of at least one of the one or more sub-goals. Constraining when policy updates are computed reduces processing and data access burdens while still providing opportunities to adjust for variations in intermediate results.

According to one or more embodiments of the present invention, a computer-implemented method includes generating, by a processor, a policy including an end goal and one or more sub-goals based at least in part on a plurality of model data and sensor data. The policy and the one or more sub-goals to a user are provided to a user. A policy adjustment request is received from a dialog system to modify one or more aspects of the policy. The processor generates one or more projected policy variations of the policy based at least in part on the policy adjustment request, a condition of the user associated with the sensor data, and the model data. The processor confirms a user selection of one of the one or more projected policy variations as an updated version of the policy. The dialog system can provide an interface for the user to explore potential effects of intentionally deviating from the policy before taking actions, which can reduce future processing workloads and data accesses associated with policy adjustments occurring as sub-goals are missed.

In one or more examples, the policy adjustment request includes an expected deviation in one or more user actions preventing at least one of the one or more sub-goals of the policy from being met. Incorporating expected deviations can enable earlier policy refinement prior to sub-goals being missed.

In one or more examples, the one or more projected policy variations of the policy adjust at least one sub-goal to increase a confidence level of the end goal being met based at least in part on the policy adjustment request, the condition of the user associated with the sensor data, and the model data. Increasing the confidence level can result in reducing the need for additional data collection for further policy refinement.

According to one or more embodiments of the present invention, a system includes a memory and a processor coupled with the memory, where the processor is configured to generate a policy including an end goal and one or more sub-goals based at least in part on a plurality of model data and sensor data. The policy and the one or more sub-goals to a user are provided to a user. A policy adjustment request is received from a dialog system to modify one or more aspects of the policy. The processor generates one or more projected policy variations of the policy based at least in part on the policy adjustment request, a condition of the user associated with the sensor data, and the model data. The processor confirms a user selection of one of the one or more projected policy variations as an updated version of the policy. The dialog system can provide an interface for the user to explore potential effects of intentionally deviating from the policy before taking actions, which can reduce future processing workloads and data accesses associated with policy adjustments occurring as sub-goals are missed.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
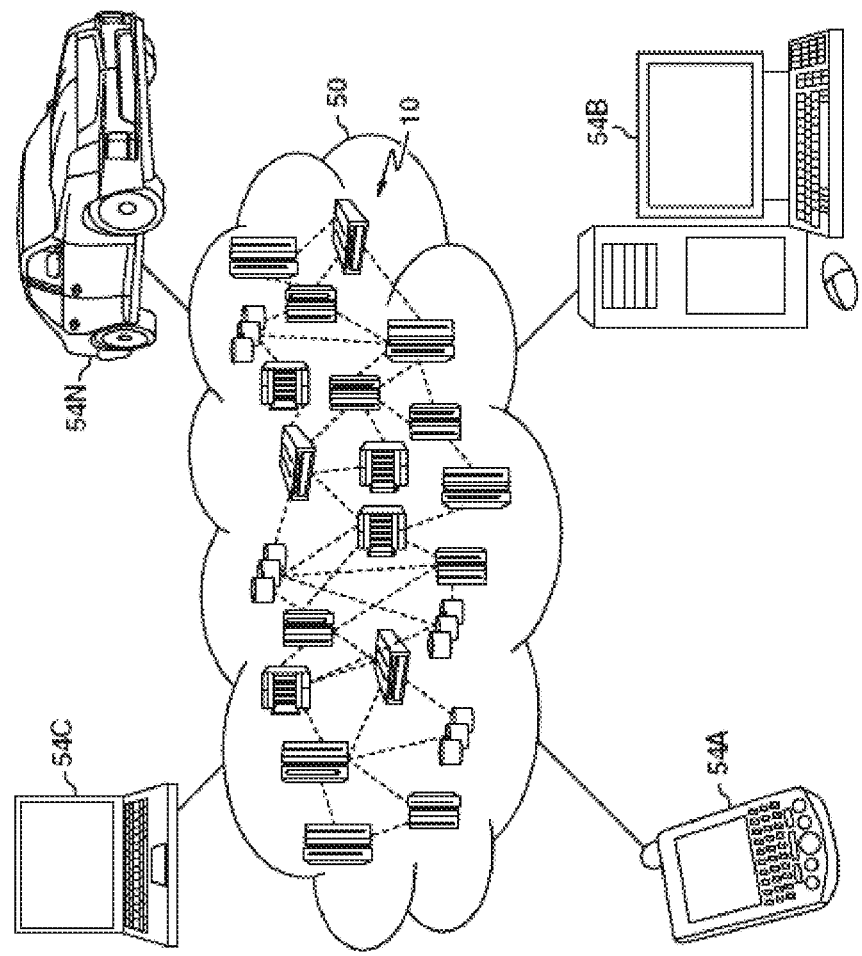
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

For example, the one or more embodiments of the present invention facilitate querying model data, gathering sensor data, generating a policy, iteratively adapting the policy, and providing the policy regarding reaching an end goal along with one or more derived sub-goals. It should be noted that the one or more embodiments of the present invention are applicable for policy adjustments using sensor data and distributed model data related to fitness tracking or any other field, and that fitness tracking is used as an example to describe the implementations and applications of one or more embodiments of the present invention.

For example, the use of computer applications and devices to track and manage fitness data is increasing. The data used by such computer program products is typically recorded on multiple dimensions of health and fitness such as daily steps, nutrition, sleep, and exercise. By tracking fitness and health data, users are empowered to analyze patterns in their data to discover both healthy and unhealthy behaviors and find where opportunities exist for improvement.

Such computer program products, which may be collectively referred to as fitness apps in addition to providing users with simple descriptive statistics, facilitate generating data-driven insights and predictions powered by machine learning and other advanced mathematical models. The statistical rigor and significance of these insights is dependent on the models used and on the validity and reliability of the input data used by the models. Typically, the input data is entered by human users, or measured and calculated via consumer-grade devices, such as activity trackers. However, inconsistencies and errors in the data can lead the analytical methods to produce inaccurate predictions and insights. Further, model data that does not reflect similar user characteristics can result in developing policy plans that are not realistic and achievable by a particular user.

For example, consider that a computer program product provides a plan to reach an end goal, such as a target weight or ability to run a target distance within a limited time, using an ideal model rather than insight into what users can achieve and what users are willing to achieve. Behaviors can be constrained with user states (e.g., whether a user has physical or emotional strength to carry out recommendations based at least in part on personal, environmental, and behavioral factors, etc.). Due to the lack of understanding and user adaptation, when a user is not responding to a system-recommended guideline, it can be difficult for a system to find an alternative solution that would be more amenable to this user given the emerging evidence of gaps between system initiatives and achieved levels of the user.

Accordingly, the one or more embodiments of the present invention addresses the above technical challenges by accessing a combination of model data from a distributed data source based at least in part on one or more user characteristics and sensor data associated with a condition of a user to generate and refine a policy for the user to achieve an end goal. The model data can identify user characteristics and actions taken by other users to achieve a similar end goal and one or more sub-goals. The model data need not be continuously accessed but can be accessed when making an initial policy or making an iterative update to a policy to gain access to relevant insights while also reducing overall network traffic for policy development and tracking.

In one or more examples, the model data is collected and distributed by a cloud computing platform. In one or more examples, the analysis is performed by the same cloud computing platform, or a separate cloud computing platform from a separate cloud computing platform that corrects the input data.

It is understood in advance that although this detailed description includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
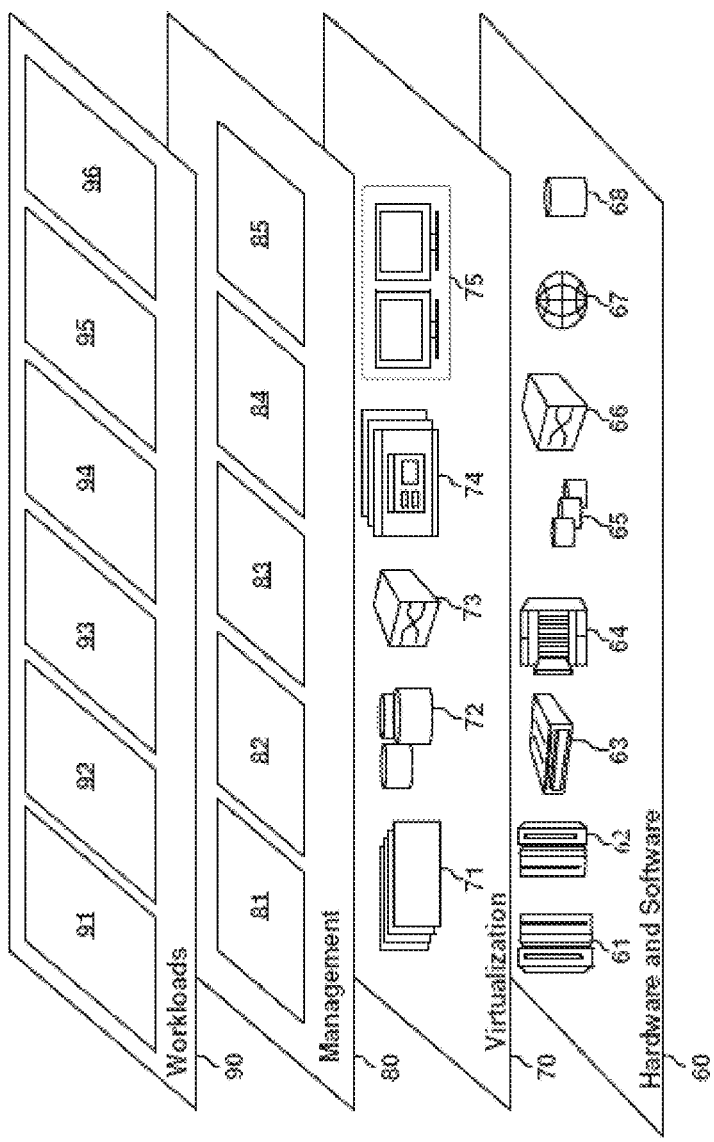
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive policy adjustment 96.

Turning now to an overview of technologies that are more specifically relevant to aspects of the invention, planning and policy development activities are not readily accurately adapted to computer-based systems due to the challenges of dealing with life context changes and unfamiliar goals of users. Basic observations and linear mapping to an end goal is an unrealistic approach that misses the daily ups and downs in motivation of users. Recommending unachievable actions typically results in failure, as users give up. Accessing multiple data sources to locate relevant model data can involve a large volume of network traffic, particularly if multiple devices directly exchange data with each other. Tracking sensor data relative to a generic-fixed model can result in a lower degree of correlation if the individual user is unable to perform at the level defined by the generic-fixed model.

Turning now to an overview of the aspects of the invention, one or more embodiments of the invention address the above-described shortcomings of the prior art by providing policy adjustments generated from adaptive feedback of sensor data collected from a mobile device, for example. Policy adjustments are based at least in part on data collected from other users having reached desired outcomes over a period of time. The data from other users can be summarized as model data from distributed sources. Querying model data for actions and previous results that closely align with one or more user characteristics provides a more accurate non-linear model for deriving policy specific sub-goals for a user while also reducing network traffic attributable to less constrained data gathering and sharing.

The above-described aspects of the one or more embodiments of the present invention address the above-described shortcomings of the prior art by determining an end goal for a user and defining one or more sub-goals to track progress based at least in part on sensor data collected over time relative to real world results collected from other users. For example, if training to run a five kilometer race within one hour is an end goal, sub-goals can be defined as completing a one mile run in twenty minutes during a first training week, followed by a two mile run within forty minutes during a second training week, followed by a three mile run within an hour during a third training week, and finally a five kilometer run within one hour during the fourth training week. Intermediate outcomes can be observed to determine how closely observations match the sub-goals. Adjustments can be made to schedule an increase or decrease in activity to successfully reach the end goal. In some embodiments, a dialog system can be used to generate one or more projected policy variations based at least in part on a policy adjustment request to determine how various actions shift sub-goals and impact the chances of reaching the end goal. Technical effects and benefits include policy adaption based at least in part on sensor data, individual user data, and data collected from distributed sources to improve policy accuracy while reducing data entry workload and network traffic.

Figure 3:
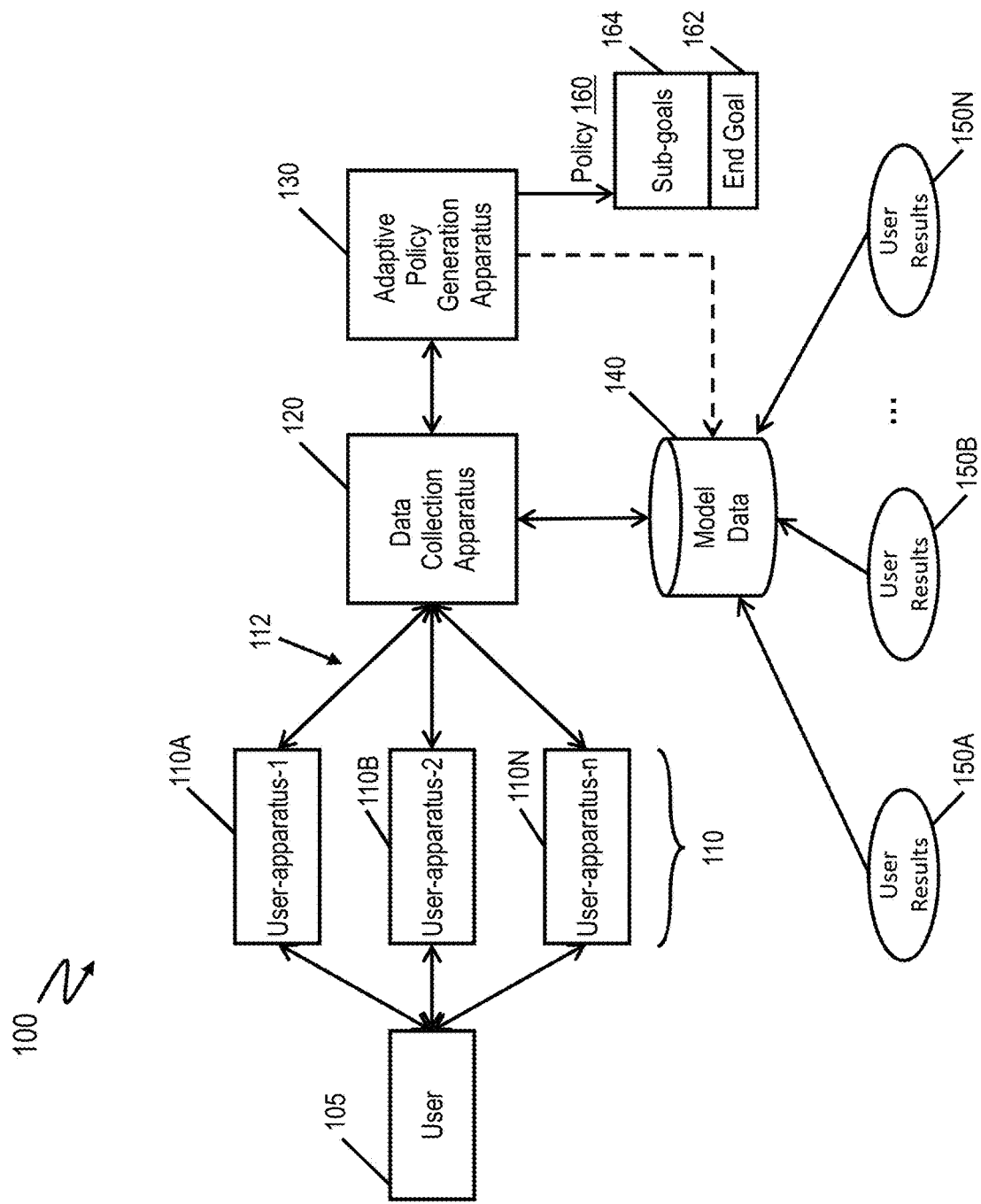
FIG. 3 depicts a system according to one or more embodiments of the present invention.

Turning now to a more detailed description of aspects of the present invention, FIG. 3 depicts a system 100 for adaptive adjustment of policies, according to one or more embodiments of the present invention. In one or more examples, the system 100 analyzes fitness tracking data for a user 105 including user-specific characteristics. Alternatively, or in addition, the system 100 analyzes other type(s) of data for the user 105. In one or more examples, the system 100 is implemented using the cloud computing platform as described herein. For example, the system 100 can include one or more server computers that are remotely accessed over a communication network. Alternatively, or in addition, the system 100 is implemented as a local system.

In one or more examples, the system 100 includes one or more user-apparatus 110, such as user activity monitors, food intake monitors, phones, tablet computers, wearable devices, and other such type of apparatus, which can be generally referred to as mobile devices that facilitate acquiring corresponding time-series of input data for analysis. The user-apparatus 110 can include a single user-apparatus-1 110A, such as a smartphone that the user 105 uses to manually enter characteristic information along with sensed data (e.g., step-counter, heart-rate monitor, position/location data, etc.) for analysis. Alternatively, or in addition, the user-apparatus 110 includes multiple devices of different types. For example, the set of user-apparatus 110 includes a user-apparatus-1 110A, a user-apparatus-2 110B, and so on until a user-apparatus-N 110N. In one or more examples, the different user-apparatus 110 track corresponding user-activity and/or food consumption using one or more sensors, such as a heart-rate monitor, a step-counter, a global position satellite sensor, a gyrometer, and the like, to gather sensor data 112.

In one or more examples, each of the user-apparatus 110 forwards the collected user-activity data for analysis. For example, the data is forwarded to predetermined destination, such as an internet protocol (IP) address, uniform resource locator (URL), or the like. In one or more examples, the data is additionally stored in a data repository as model data 140 that is accessible by other components of the system 100. In one or more examples, the data repository is a database. The data forwarded by the user-apparatus 110 can be analyzed in real-time by data collection apparatus 120.

In one or more examples, the system 100 includes an adaptive policy generation apparatus 130 that processes the data to determine a policy 160 with an end goal 162 and one or more sub-goals 164 for the user 105. The one or more sub-goals 164 are derived to track similar to other users from model data 140 and can be adjusted as the user 105 meets or misses the sub-goals 164. The sub-goals 164 can be established as reaching particular milestones (threshold levels) at a predicted time based at least in part on taking recommended actions.

The data collection apparatus 120 of system 100 processes (e.g., gathers, conditions, normalizes, etc.) sensor data 112 from each of the user-apparatus 110 and model data 140 prior to use by the adaptive policy generation apparatus 130. The data collection apparatus 120 can query the model data 140 to identify actions and results collected from multiple users, such as user results 150A, 150B, . . . , 150N as a distributed data source. The user results 150A-150N can reside on a plurality of devices accessible through a cloud or other network infrastructure. Model data 140 can represent a snapshot of data collected from the user results 150A-150N or can be dynamically formed and/or updated in response to a query. Querying for similar user characteristics allows the data collection apparatus 120 to send a more limited and focused subset of the model data 140 to the adaptive policy generation apparatus 130 to serve as one or more targets or "oracles" for establishing sub-goals 164 and corresponding rules specific to the end goal 162 of the user 105. The user characteristics can be gathered by the data collection apparatus 120 through a user interface to capture information such as gender, age, weight, height, self-assessed fitness level, and other such data to assist in identifying and grouping similar users. The adaptive policy generation apparatus 130 can also report results for the user 105 back to the model data 140 for use in developing policies for other users.

It should be noted that although FIG. 3 depicts the data collection apparatus 120 and the adaptive policy generation apparatus 130 as separate boxes, in one or more examples, the system 100 can implement the data collection apparatus 120 and the adaptive policy generation apparatus 130 on a single machine.

Figure 4:
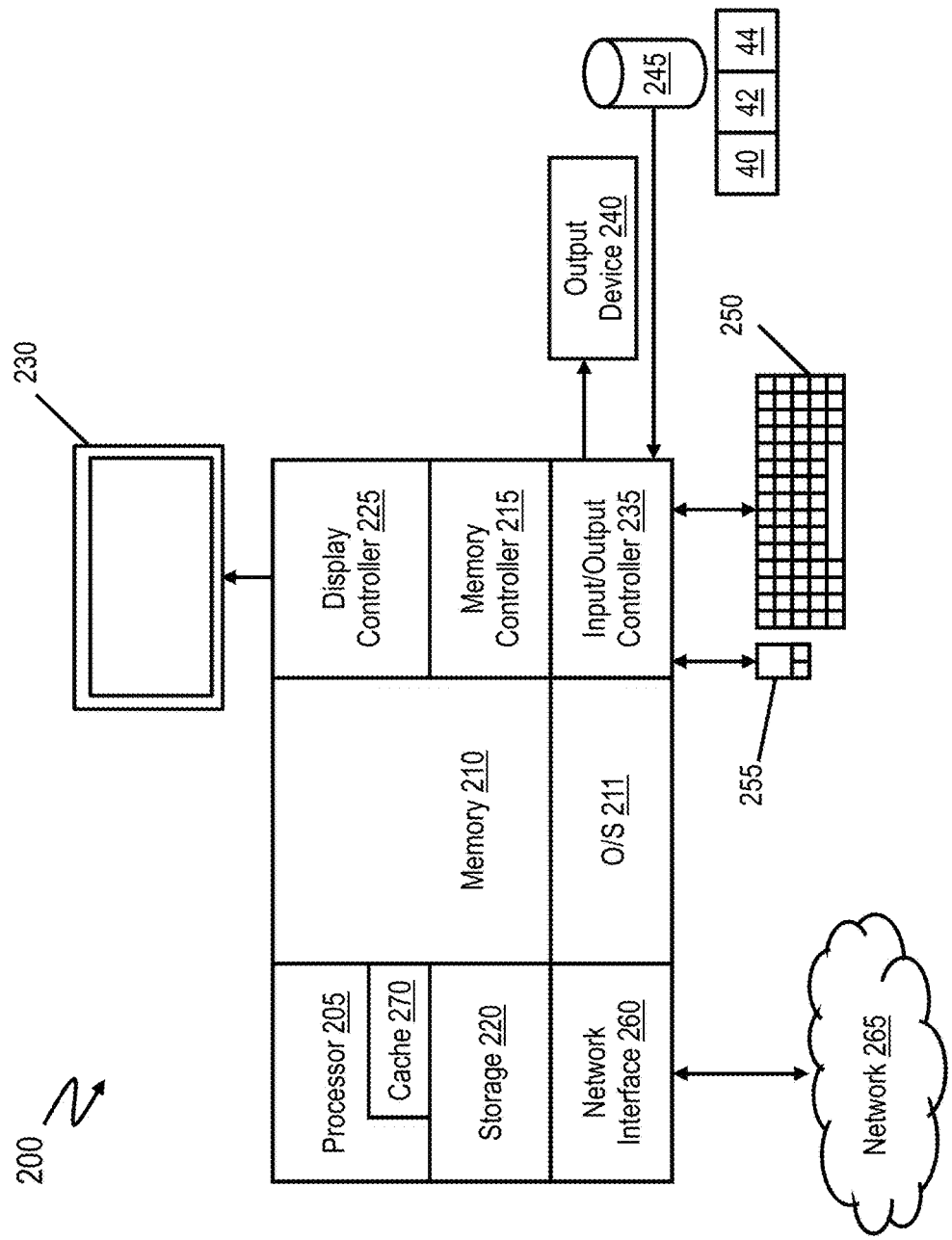
FIG. 4 depicts a computer system according to one or more embodiments of the present invention.

FIG. 4 depicts a computer system 200, according to one or more embodiments of the present invention. The communication apparatus can be a computer, such as a server, a laptop computer, a tablet computer, a phone, and the like. The computer system 200 can be used as any one or more of the apparatus depicted in FIG. 3, such as the user-apparatus 110, the data collection apparatus 120, the adaptive policy generation apparatus 130, or a combination thereof.

The computer system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 can include, for example, battery sensors, position/motion sensors (altimeter 40, accelerometer 42, GPS 44), indicator/identification lights, cameras, microphones, speakers, and the like. Input devices such as a conventional keyboard 250 and mouse 255 can be coupled to the I/O controller 235. The I/O controller 235 can be, for example, one or more buses or other wired or wireless connections, as are known in the art. The I/O controller 235 can have additional elements, which are omitted for simplicity, such as controllers, buffers (caches), drivers, repeaters, and receivers, to enable communications.

The I/O devices 240, 245 can further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 205 (also referred to as a processing circuit) is a hardware device for executing hardware instructions or software (e.g., program instructions), particularly those stored in memory 210. The processor 205 can be a custom made or commercially available processor, a central processing unit (CPU), an auxiliary processor among several processors associated with the computer system 200, a semiconductor based microprocessor (in the form of a microchip or chip set), a macroprocessor, or other device for executing instructions. The processor 205 includes a cache 270, which can include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 can be organized as a hierarchy of more cache levels (L1, L2, and so on).

The memory 210 can include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 can incorporate electronic, magnetic, optical, or other types of storage media. Note that the memory 210 can have a distributed architecture, where various components are situated remote from one another but can be accessed by the processor 205.

The instructions in memory 210 can include one or more separate programs, each of which includes an ordered listing of executable instructions for implementing logical functions. In the example of FIG. 4, the instructions in the memory 210 include a suitable operating system (OS) 211. The operating system 211 essentially can control the execution of other computer programs and provides scheduling, input-output control, file and data management, memory management, and communication control and related services.

Additional data, including, for example, instructions for the processor 205 or other retrievable information, can be stored in storage 220, which can be a storage device such as a hard disk drive or solid state drive. The stored instructions in memory 210 or in storage 220 can include those enabling the processor to execute one or more aspects of the systems and methods described herein.

The computer system 200 can further include a display controller 225 coupled to a user interface or display 230. In some embodiments, the display 230 can be an LCD screen. In other embodiments, the display 230 can include a plurality of LED status lights. In some embodiments, the computer system 200 can further include a network interface 260 for coupling to a network 265. The network 265 can be an IP-based network for communication between the computer system 200 and an external server, client and the like via a broadband connection. In an embodiment, the network 265 can be a satellite network. The network 265 transmits and receives data between the computer system 200 and external systems. In some embodiments, the network 265 can be a managed IP network administered by a service provider. The network 265 can be implemented in a wireless fashion, for example, using wireless protocols and technologies, such as WiFi, WiMax, satellite, or any other. The network 265 can also be a packet-switched network such as a local area network, wide area network, metropolitan area network, the Internet, or other similar type of network environment. The network 265 can be a fixed wireless network, a wireless local area network (LAN), a wireless wide area network (WAN) a personal area network (PAN), a virtual private network (VPN), intranet or other suitable network system and can include equipment for receiving and transmitting signals.

Figure 5:
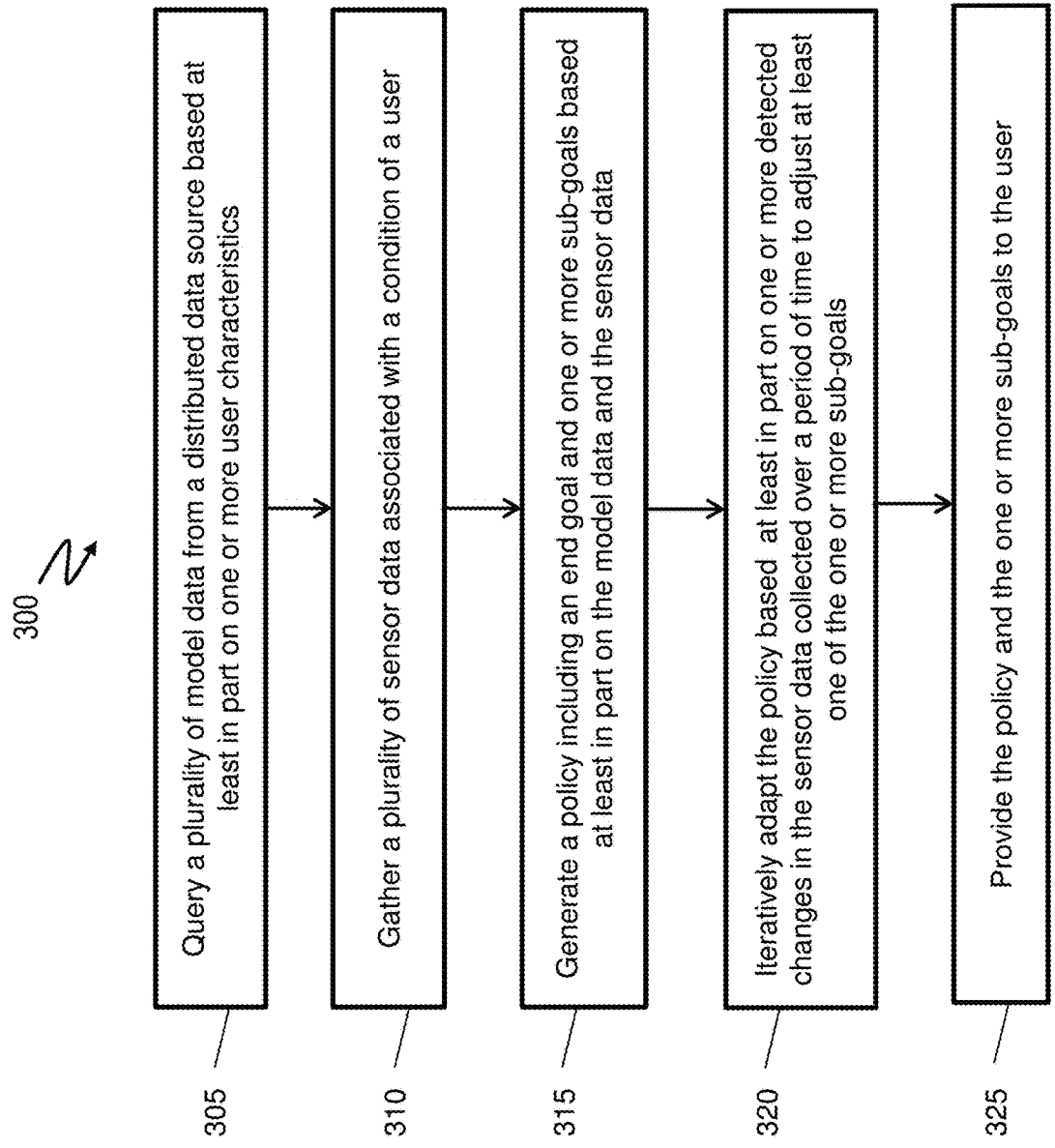
FIG. 5 depicts a process for adaptive adjustment, according to one or more embodiments of the present invention.

FIG. 5 illustrates a process 300 for adaptive adjustment of a policy, such as the policy 160 of FIG. 3. The process 300 is described with reference to FIGS. 1-5 and can include additional steps beyond those depicted in FIG. 5. The process 300 can be performed by data collection apparatus 120 and the adaptive policy generation apparatus 130 of system 100 of FIG. 3.

At block 305, data collection apparatus 120 queries a plurality of model data 140 from a distributed data source based at least in part on one or more user characteristics of the user 105, where the model data 140 can be gathered from user results 150A-150N compiled from a plurality of other users as the distributed data source. The user characteristics can include information such as gender, age, weight, height, self-assessed fitness level, and other such data to assist in identifying and grouping similar users.

At block 310, data collection apparatus 120 gathers a plurality of sensor data 112 from user-apparatus 110 associated with a condition of the user 105. The condition of the user 105 can be, for example, a current heart rate, a number of steps completed for a period of time, a current weight, and/or other observable data to assist in making a relative fitness, activity level, and/or wellness assessment.

At block 315, adaptive policy generation apparatus 130 generates a policy 160 including an end goal 162 and one or more sub-goals 164 based at least in part on the model data 140 and the sensor data 112. The adaptive policy generation apparatus 130 can determine a plurality of behavioral patterns of the user 105 based at least in part on the one or more user characteristics and the sensor data 112. The behavioral patterns can include patterns of when activity and rest periods occur, when intensity of activity rises and falls, trending, and the like. The one or more sub-goals 164 can include one or more personalized thresholds derived from the behavioral patterns. The adaptive policy generation apparatus 130 can use a table lookup or statistical functional approximation to determine a sequence of decision rules based at least in part on the one or more sub-goals 164 and a confidence level indicating a likelihood of meeting the end goal using the sequence of decision rules.

At block 320, adaptive policy generation apparatus 130 iteratively adapts the policy 160 based at least in part on one or more detected changes in the sensor data 112 collected over a period of time to adjust at least one of the one or more sub-goals 164. Iteratively adapting the policy 160 can include performing an updated evaluation of the sensor data 112 collected over the period of time in combination with a plurality of previously collected instances of the sensor data 112 using statistical and reinforcement learning to classify the one or more detected changes. The adaptive policy generation apparatus 130 can adjust at least one sub-goal 164 based at least in part on detecting that the user 105 has exceeded or missed a previously determined instance of at least one of the one or more sub-goals 164.

At block 325, system 100 provides the policy 160 and the one or more sub-goals 164 to the user 105. In some embodiments, the policy 160 is provided to the user 105 based at least in part on comparing the confidence level to an acceptance threshold and determining that the confidence level meets the acceptance threshold (e.g., confidence is "high" that the policy 160 will meet the end goal 162). Based at least in part on determining that the confidence level does not meet the acceptance threshold, adaptive policy generation apparatus 130 can search for a plurality of additional actions between a capability of the user 105 and a plurality of model actions from the model data 140. The user 105 can be prompted to perform one or more of the additional actions. A plurality of additional user data can be collected by the data collection apparatus 120 based at least in part on performance of the one or more of the additional actions by the user, and the adaptive policy generation apparatus 130 can further adapt the policy 160 based at least in part on the additional user data.

Figure 6:
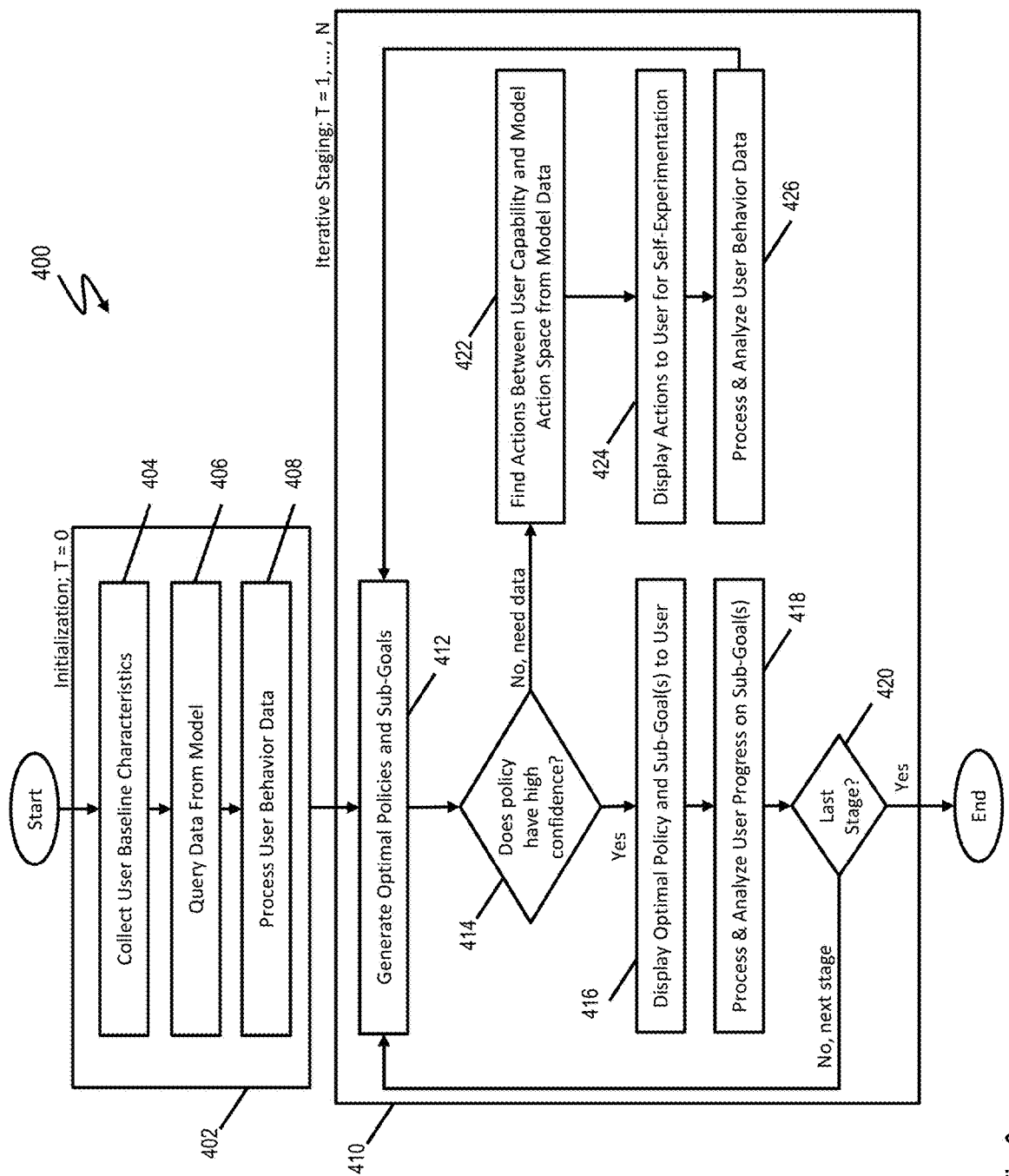
FIG. 6 depicts a flowchart of an example method for adaptive adjustment, according to one or more embodiments of the present invention.

FIG. 6 illustrates a flowchart of an example method 400 for adaptive adjustment, according to one or more embodiments of the present invention. The one or more operations illustrated are implemented by one or more components of the system 100 and described with reference to FIG. 3.

To initialize the sequence, information about each participant's characteristics and baseline health status (e.g., baseline stress level) is collected at block 404 of initialization 402, for instance by data collection apparatus 120. Initialization 402 also includes block 406 to query data from model data 140 and block 408 to process user behavior data.

At each stage in iterative staging 410 (e.g., stages 1 to N), an action (e.g., moderate or vigorous physical activity (MVPA) pattern) and an intermediate health outcome (e.g., intermediate stress level) are observed. In the notation that follows, lower-case variables are the realizations of corresponding upper-case random variables. For example, o is a particular realization of the random variable O. In a T-stage study for each participant i, the data observed is: $\{O_{i1}, A_{i1}, O_{i2}, A_{i2}, \ldots, O_{iT}, A_{iT}, Y_i\}$.

$O_{i1}$ is a scalar of a baseline health outcome measure, and $O_{it}$ where $1 < t \leq T$ is a scalar of an intermediate health outcome measure at the end of stage t. $A_{it}$ is a scalar of action for participant i at stage t. To simplify the problem, only binary actions are considered in this example. An action can be coded as 1 ("active") if the cumulative count of MVPA bouts in stage t is greater than 3 for example, and an action can be coded as 0 ("inactive") otherwise; $Y_i$ is a scalar of a final health outcome measure for participant i to optimize. Let $H_{it}$ denote the historical information for participant i prior to, and including, stage t. For example, $H_{it} = \{O_{i1}, A_{i1}, \ldots, O_{it}\}$. If desired, additional variables can be added to $H_{it}$ to capture any interactions between historical outcomes and actions. In an example data set, the baseline health outcome $O_{i1}$, the intermediate health outcome $O_{it}$ where $1 < t \leq T$ and the final health outcome can be the stress levels for each participant i.

Q-learning is a way to construct high-quality policies. For example, a policy can be defined as a set of decision rules that takes in historical information of a user and outputs a recommended action. Q-learning learns an action-state value function, referred to as a Q function (Quality of the action-state), and uses backward induction to estimate a policy that maximizes cumulative rewards. The state can be implicitly represented by a function of historical outcomes and actions. Because the goals are to maximize the beneficial final outcome or minimize the negative final outcome, the total reward can be defined as the final outcome of interest $Y_i$, if it is beneficial, or as $-Y_i$, if it is hazardous. A parametric regression model for the Q function can be used at each stage to learn the optimal policy that maximizes the reward for a finite time horizon (i.e., the final stage T, is a finite number). In a T-stage study, the Q function is specified as follows.

In a final stage, T: $Q_T(h_T, a_T) = E(Y|H_T=h_T, A_T=a_T)$
In a previous stage, t:

$$Q_t(h_t, a_t) = (\max_{a_{t+1}} Q_{t+1}(h_{t+1}, a_{t+1})|H_t=h_t, A_t=a_t)$$

A parametric regression model can be used for the Q function, where the Q function at stage t is denoted as $Q_t(h_t, a_t; \theta_t)$, and $\theta_t$ is a vector of regression coefficients in the linear regression model. An example of this linear approximation for the case where T=2 is provided below.

In the second stage:

$$Q_2(h_{i2}, a_{i2}; \theta_2) = \theta_{20} + \theta_{21}a_{i1} + \theta_{22}o_{i1} + (\theta_{23} + \theta_{24}a_{i1})o_{i2} + \theta_{25}o_{i2} + (\theta_{26} + \theta_{27}a_{i1} + \theta_{28}o_{i1} + (\theta_{29} + \theta_{210}a_{i1})o_{i2} + \theta_{211}o_{i1}o_{i2})a_{i2}$$

In the first stage:

$$Q_1(h_{i1}, a_{i1}; \theta_1) = \theta_{10} + \theta_{11}o_{i1} + (\theta_{12} + \theta_{13}o_{i1})a_{i1}$$

The optimal policy is defined as the policy under which the maximized value of the Q function is achieved. Thus the optimal policy at stage, t, is $$\pi_t^*(h_t; \theta_t) = \mathrm{argmax}_{a_t} Q_t(h_t, a_t; \theta_t)$$

The method is based at least in part on the Q-learning method with a linear approximation and has threshold selection added into the learning process. Policy estimation with a threshold embedded is illustrated in a two-stage study as one example, but any number of stages can be used. To formulate the problem in mathematical terms, $R_{it}$ is defined to be the dichotomized health outcome of the participant i in the stage t, where $R_{it} = I(O_{it} > C_t)$, $C_t$ is the threshold to be estimated at each stage, and I( ) is an indicator function. Therefore, if the outcome, $O_{it}$ exceeds $C_t$, then $R_{it}=1$. Otherwise, $R_{it}=0$. The threshold, $C_t$, can be considered to be the outcome goal option (e.g., stress level). Therefore, $R_{it}$ indicates whether the participant i has met the goal in the stage t.

For ease of explanation, the following example uses the assumption that T=2. However, in general, T can be any non-negative integer. The following outcomes are considered: the baseline outcome, $O_{i1}$, the intermediate outcome, $O_{i2}$, and the final outcome $Y_i$. The resulting policy takes the form of a linear combination of the dichotomized outcomes. The Q function at the second stage is defined as $$Q_2(h_{i2}, a_{i1}; \theta_2, c_1, c_2) = \theta_{20} + \theta_{21}a_{i1} + \theta_{22}o_{i1} + (\theta_{23} + \theta_{24}a_{i1})o_{i2} + \theta_{25}o_{i1}o_{i2} + (\theta_{26} + \theta_{27}a_{i1} + \theta_{28}r_{i1} + (\theta_{29} + \theta_{210}a_{i1})r_{i2} + \theta_{211}r_{i1}r_{i2})a_{i2}$$

The Q function in the first stage is $$Q_1(h_{i1}, a_{i1}; \theta_1, c_1) = \theta_{10} + \theta_{11}o_{i1} + (\theta_{12} + \theta_{13}r_{i1})a_{i1}$$

where $r_{i1} = I(O_{i1} > c_1)$ and $r_{i2} = I(O_{i2} > c_2)$.
The optimal policy in the second stage takes the form:

$$\pi_2^*(h_{i2}; \theta_2, c_1, c_2) = \mathrm{argmax}_{a_{i2}}(\theta_{26} + \theta_{27}a_{i1} + \theta_{28}r_{i1} + (\theta_{29} + \theta_{210}a_{i1})r_{i2} + \theta_{211}r_{i1}r_{i2})a_{i2}$$

The optimal policy at the first stage takes the form:

$$\pi_1^*(h_{i1}; \theta_1, c_1) = \mathrm{argmax}_{a_{i1}}(\theta_{12} + \theta_{13}r_{i1})a_{i1}$$

The optimal policy can be estimated using backward induction in order to maximize cumulative rewards over the time horizon. Parameters of interest contain information about how different actions affect the value of the Q function. Therefore, the parameters of interest are the regression coefficients $\{\theta_{12}, \theta_{13}\}$ and $\{\theta_{26}, \theta_{27}, \theta_{28}, \theta_{29}, \theta_{210}, \theta_{211}\}$, and the threshold parameters $\{c_1, c_2\}$.

The estimation of an optimal policy includes the estimation of regression parameters $\{\theta_1, \theta_2\}$, and the estimation of threshold parameters $\{c_1, c_2\}$. The regression parameters can be estimated as least squares estimators. The threshold parameters can be estimated to maximize a beneficial expected weighted outcome or to minimize a negative one based at least in part on an inverse probability weighting estimator (IPWE) using a genetic algorithm, for example. The genetic algorithm is a type of heuristic search algorithm.

In order to estimate the threshold parameters and evaluate the estimated policy, the IPWE is used. The IPWE is a weighted marginal mean of the final outcome, Y. The IPWE can be defined as $$\frac{E\left(\sum_{i=1}^{n} W_i Y_i\right)}{E\left(\sum_{i=1}^{n} W_i\right)}$$

$W_i$ is referred to as the inverse probability weights. When T=2, for each participant i, $$W_i = \frac{I(a_{i1} = \pi_1(h_{i1}))I(a_{i2} = \pi_2(h_{i2}))}{p_1(a_{i1}|h_{i1})p_2(a_{i2}|h_{i2})},$$

$I(a_{it} = \tau_t(h_{it}))$ is an indicator function that indicates whether the observed action agrees with the optimal action estimated from policy $\pi_t$. $p_t(a_{it}|h_{it})$ is the propensity score estimated using logistic regression, and it captures the likelihood that participant i will take action a in stage t, given the history of actions and outcomes for that participant.

Assuming the final outcome, Y, is a beneficial outcome, the threshold parameters are chosen to maximize the IPWE so that the optimal mean outcome is achieved. IPWE is a nonparametric estimator and does not depend on the linear approximation for the Q function. Thus, IPWE is robust to the misspecification of the Q function model. IPWE can also be used to evaluate policies that are estimated under different model assumptions for the Q function.

Using this framework, the adaptive policy generation apparatus 130 can generate optimal policies and sub-goals at block 412. At block 414, a confidence level is checked to determine whether policy 160 has a "high" confidence (e.g., above an acceptance threshold). If there is a high confidence level at block 414, then the policy 160 and sub-goals 164 are displayed to the user 105 at block 416. The adaptive policy generation apparatus 130 can process and analyze user progress on sub-goals 164 at block 418. If at block 420, the last stage (stage N) has been reached, then method 400 is complete. Otherwise, the flow returns to block 412. If there is not a high confidence level at block 414 (e.g., confidence level is less than the acceptance threshold), then the adaptive policy generation apparatus 130 can find actions between the user capability and model action space of model data 140 at block 422. At block 424, actions can be displayed to the user 105 for self-experimentation to encourage the user 105 to perform additional actions to assist in more closely aligning the user 105 with one or more examples from model data 140. At block 426, the user behavior data is processed and analyzed, and the flow returns to block 412.

Figure 7:
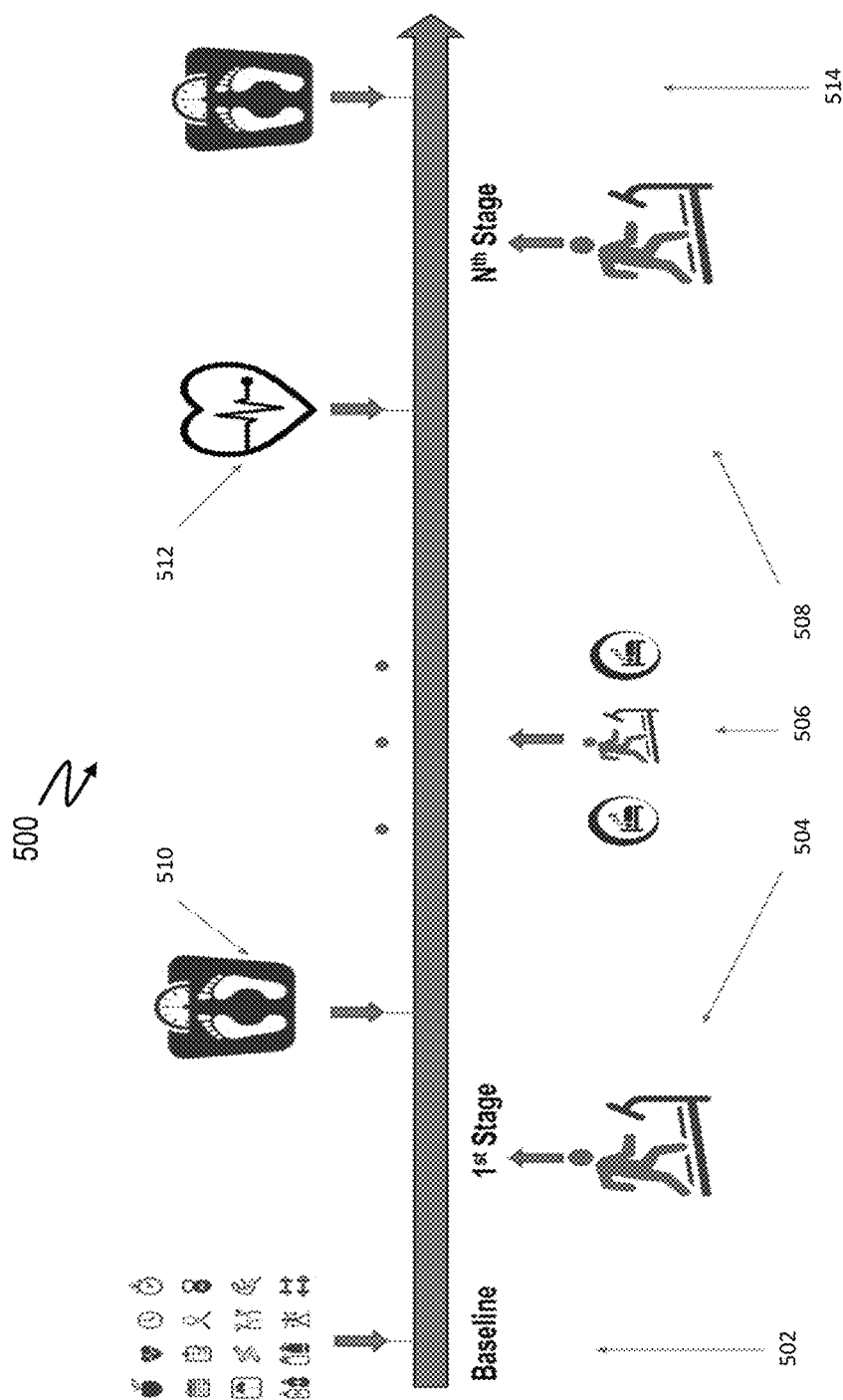
FIG. 7 depicts an example scenario, such as a fitness tracking example scenario.

FIG. 7 depicts an example scenario 500, such as a fitness tracking example scenario for generating and adjusting a policy, such as policy 160 of FIG. 3, and is described with reference to FIG. 3. At 502, baseline characteristic information and a baseline weight are observed based at least in part on sensor data 112 of FIG. 3 and/or manually input user characteristics. Stages 1 to N are established as sub-goals 164 to choose an action planned at a first stage 504, intermediate stages 506, and end stage 508 using updated information to re-plan as needed. For instance, tailoring variables can be observed at an early stage 510 and intermediate outcomes can be observed at later stages 512. A final outcome 514 is observed when the end goal 162 is reached or should have been reached. Actions can include guidance as to when the user 105 should be active and resting, along with suggested exercise types, durations, intensities, and the like.

As one example, at 502, baseline characteristic information can include that the user characteristics are a thirty year old male with a height of sixty-eight inches and an initial weight of one hundred and ninety pounds. During the first stage 504, the policy 160 can be if the initial weight is greater than one hundred and eighty pounds, recommend that activity be performed; otherwise, no activity recommendation is needed. During intermediate stages 506, if an intermediate weight is above one hundred and eighty-eight pounds, recommend that activity be performed; otherwise, activity level recommendations can be made based at least in part on relative weight changes to align with similar user data for another user (e.g., a 25-35 year old male between 66 and 70 inches tall, for instance) that reached a similar target result by end stage 508.

Figure 8:
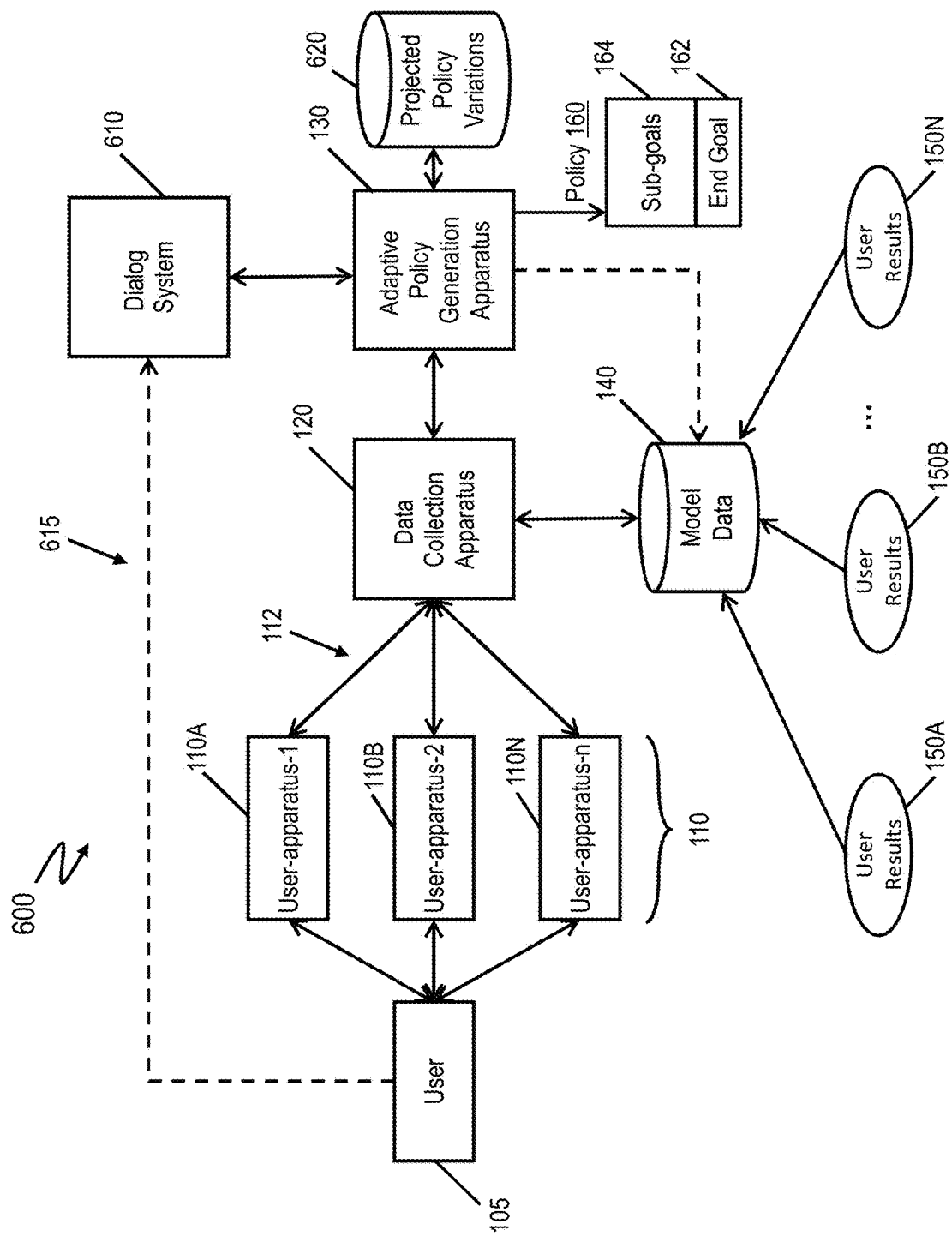
FIG. 8 depicts a system for adaptive adjustment using a dialog system, according to one or more embodiments of the present invention.

FIG. 8 depicts a system 600 for adaptive adjustment using a dialog system 610 according to one or more embodiments of the present invention. Similar to the system 100 of FIG. 3, the system 600 analyzes fitness tracking data for a user 105 including user-specific characteristics. The system 100 includes one or more user-apparatus 110, such as user-apparatus-1 110A, a user-apparatus-2 110B, and so on until a user-apparatus-N 110N. In one or more examples, the system 600 includes a data collection apparatus 120 and an adaptive policy generation apparatus 130 that processes the data to generate a prediction and/or insight. For example, the adaptive policy generation apparatus 130 determines a policy 160 with an end goal 162 and one or more sub-goals 164 for the user 105. The data collection apparatus 120 processes (e.g., gathers, conditions, normalizes, etc.) sensor data 112 from each of the user-apparatus 110 and model data 140 prior to use by the adaptive policy generation apparatus 130.

In the example of FIG. 8, the dialog system 610 of system 600 is operable to receive a policy adjustment request 615 from the user 105 to modify one or more aspects of the policy 160. The dialog system 610 can provide interactive dialog (e.g., a chat flow) to the user 105 to accomplish a task with a question answering interface and provide a natural language response using question answering interface techniques known in the art. For example, the dialog system 610 can enable the user 105 to ask for the effects of potential modifications to the policy 160, such as, "What happens if I take this weekend off from training?" The adaptive policy generation apparatus 130 can generate one or more projected policy variations 620 of the policy 160 based at least in part on the policy adjustment request, a condition of the user 105 associated with the sensor data 112, and the model data 140. As the user 105 can explore different possible scenarios, the resulting possible policy modifications can be captured in the projected policy variations 620 for later analysis and selection. When the user 105 confirms a user selection of one of the one or more projected policy variations 620 as an updated version of the policy 160, the policy 160 is adjusted as an updated version to match the desired modifications.

Figure 9:
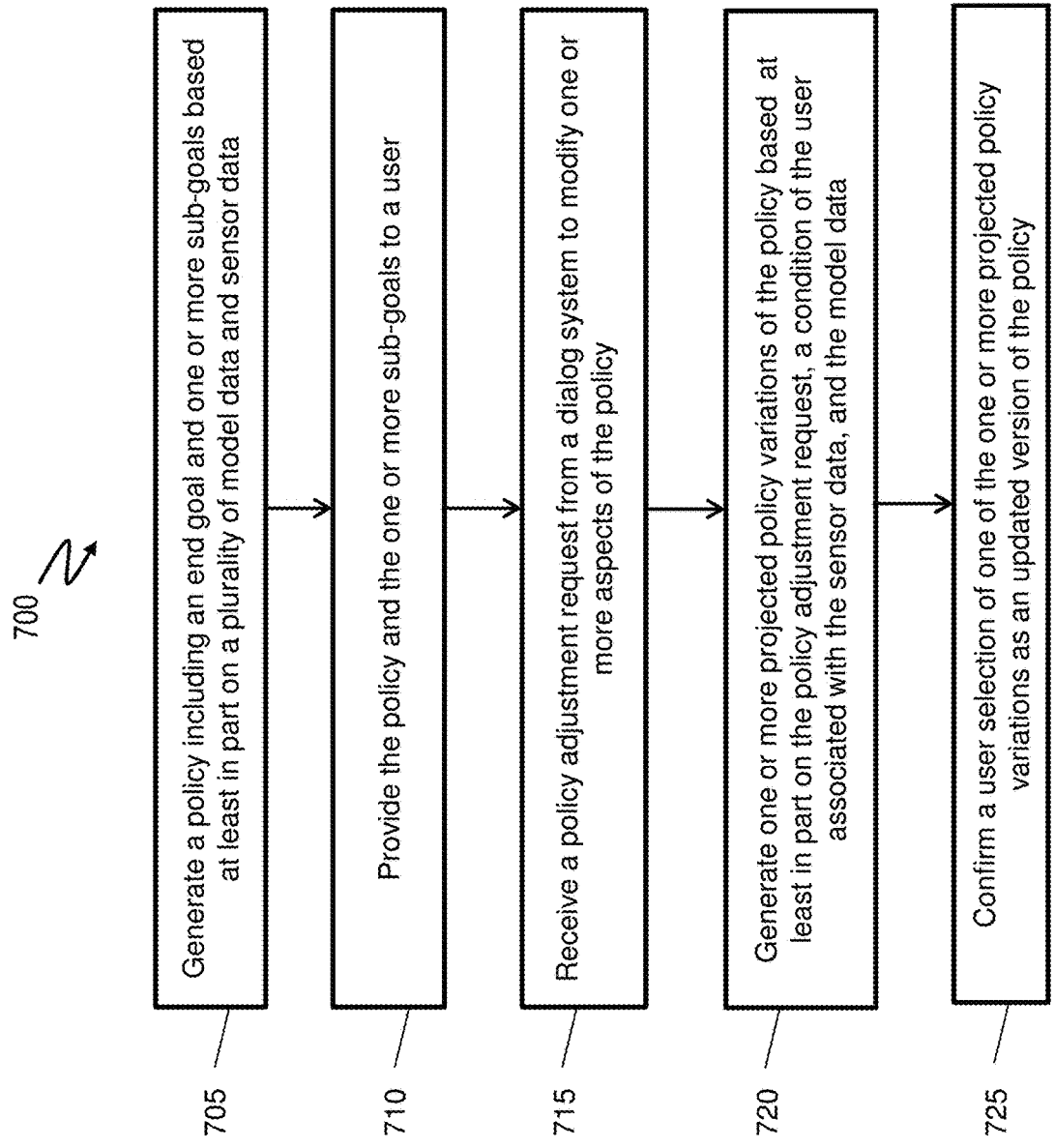
FIG. 9 depicts a process for adaptive adjustment using a dialog system, according to one or more embodiments of the present invention.

FIG. 9 depicts a process 700 for adaptive adjustment using a dialog system, such as dialog system 610 of FIG. 8 according to one or more embodiments of the present invention. The process 700 is described with reference to FIGS. 1-9 and can include additional steps beyond those depicted in FIG. 9. The process 700 can be performed by system 600 of FIG. 8.

At block 705, adaptive policy generation apparatus 130 generates a policy 160 including an end goal 162 and one or more sub-goals 164 based at least in part on a plurality of model data 140 and sensor data 112. At block 710, adaptive policy generation apparatus 130 provides the policy 160 and the one or more sub-goals 164 to a user 105.

At block 715, adaptive policy generation apparatus 130 receives a policy adjustment request 615 from a dialog system 610 to modify one or more aspects of the policy 160. The policy adjustment request 615 can include an expected deviation in one or more user actions preventing at least one of the one or more sub-goals 164 of the policy 160 from being met. For instance, if user 105 plans to take a week off from training, this is an expected deviation if not already incorporated in the policy 160.

At block 720, adaptive policy generation apparatus 130 generates one or more projected policy variations 620 of the policy 160 based at least in part on the policy adjustment request, a condition of the user associated with the sensor data 112, and the model data 140. The one or more projected policy variations 620 of the policy 160 can adjust at least one sub-goal 164 to increase a confidence level of the end goal 162 being met based at least in part on the policy adjustment request, the condition of the user 105 associated with the sensor data 112, and the model data 140. At block 725, adaptive policy generation apparatus 130 confirms a user selection of one of the one or more projected policy variations 620 as an updated version of the policy 160.

Thus, the technical solutions described herein facilitate systems to adaptively adjust a policy using sensor data and model data. In one or more examples, decomposing a policy into sub-goals and an end goal enables stages of data collection and analysis to be performed over a period of time and to trigger policy adjustment at intervals defined by the sub-goals. The use of a dialog system can enable a user to provide hypothetical changes to intended actions and visualize the potential impact to the policy along with a likelihood of successfully meeting the end goal. A dialog system can also provide a meaningful interpretation of the policy and sub-goals to explain, for instance, why actions have been selected, why particular sub-goals have been selected, and impacts of adjustments to the sub-goals and actions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   querying, by a processor, a plurality of model data from a distributed data source based at least in part on one or more user characteristics;
   gathering, by the processor, a plurality of sensor data associated with a condition of a user;
   generating, by the processor, a policy comprising an end goal and one or more sub-goals based at least in part on the model data and the sensor data, wherein the policy is generated using machine learning that learns an action-state value function and uses backward induction to estimate the policy with a parametric regression model for intermediate stress level and participant physical activity pattern per stage for a plurality of stages;
   iteratively adapting the policy, by the processor, based at least in part on one or more detected changes in the sensor data collected over a period of time to adjust at least one of the one or more sub-goals, the iteratively adapting comprising:
      determining a confidence level indicating a likelihood of meeting the end goal;
      comparing the confidence level to an acceptance threshold;
      based at least in part on determining that the confidence level does not meet the acceptance threshold, searching for a plurality of additional actions between a capability of the user and a plurality of model actions from the model data; and
      based at least in part on determining that the confidence level meets the acceptance threshold, selecting the policy and the one or more sub-goals for display to the user; and
   providing the policy and the one or more sub-goals to the user in combination with an interpretation of the policy and the one or more sub-goals that explains why the one or more sub-goals have been selected and one or more impacts of adjustment of at least one of the one or more sub-goals.

2. The computer-implemented method of claim 1, further comprising determining a plurality of behavioral patterns of the user based at least in part on the one or more user characteristics and the sensor data.

3. The computer-implemented method of claim 2, wherein the one or more sub-goals comprise one or more personalized thresholds derived from the behavioral patterns.

4. The computer-implemented method of claim 3, further comprising using a table lookup or statistical functional approximation to determine a sequence of decision rules based at least in part on the one or more sub-goals and the confidence level indicating the likelihood of meeting the end goal using the sequence of decision rules.

5. The computer-implemented method of claim 4, further comprising:
   prompting the user to perform one or more of the additional actions;
   collecting a plurality of additional user data based at least in part on performance of the one or more of the additional actions by the user; and
   further adapting the policy based at least in part on the additional user data.

6. The computer-implemented method of claim 1, wherein iteratively adapting the policy comprises performing an updated evaluation of the sensor data collected over the period of time in combination with a plurality of previously collected instances of the sensor data using statistical and reinforcement learning to classify the one or more detected changes, and further wherein the policy is learned using the parametric regression model for a Q-function at each stage of a multiple stage analysis, and each stage has a different outcome goal.

7. The computer-implemented method of claim 1, further comprising adjusting at least one sub-goal based at least in part on detecting that the user has exceeded or missed a previously determined instance of at least one of the one or more sub-goals.

8. A system comprising:
a memory; and
a processor coupled with the memory, the processor configured to:
- query a plurality of model data from a distributed data source based at least in part on one or more user characteristics;
- gather a plurality of sensor data associated with a condition of a user;
- generate a policy comprising an end goal and one or more sub-goals based at least in part on the model data and the sensor data, wherein the policy is generated using machine learning that learns an action-state value function and uses backward induction to estimate the policy with a parametric regression model for intermediate stress level and participant physical activity pattern per stage for a plurality of stages;
- iteratively adapt the policy based at least in part on one or more detected changes in the sensor data collected over a period of time to adjust at least one of the one or more sub-goals, the iteratively adaption comprising:
  - determine a confidence level indicating a likelihood of meeting the end goal;
  - compare the confidence level to an acceptance threshold;
  - based at least in part on determining that the confidence level does not meet the acceptance threshold, search for a plurality of additional actions between a capability of the user and a plurality of model actions from the model data; and
  - based at least in part on determining that the confidence level meets the acceptance threshold, select the policy and the one or more sub-goals for display to the user; and
- provide the policy and the one or more sub-goals to the user in combination with an interpretation of the policy and the one or more sub-goals that explains why the one or more sub-goals have been selected and one or more impacts of adjustment of at least one of the one or more sub-goals.

9. The system of claim 8, wherein the processor is further configured to determine a plurality of behavioral patterns of the user based at least in part on the one or more user characteristics and the sensor data, wherein the one or more sub-goals comprise one or more personalized thresholds derived from the behavioral patterns.

10. The system of claim 9, wherein the processor is further configured to use a table lookup or statistical functional approximation to determine a sequence of decision rules based at least in part on the one or more sub-goals and the confidence level indicating the likelihood of meeting the end goal using the sequence of decision rules.

11. The system of claim 10, wherein the processor is further configured to:
- prompt the user to perform one or more of the additional actions;
- collect a plurality of additional user data based at least in part on performance of the one or more of the additional actions by the user; and
- further adapt the policy based at least in part on the additional user data.

12. The system of claim 8, wherein iterative adaption of the policy comprises an updated evaluation of the sensor data collected over the period of time in combination with a plurality of previously collected instances of the sensor data using statistical and reinforcement learning to classify the one or more detected changes, and further wherein the policy is learned using a parametric regression model for a Q-function at each stage of a multiple stage analysis, and each stage has a different outcome goal.

13. The system of claim 8, wherein the processor is further configured to adjust at least one sub-goal based at least in part on detecting that the user has exceeded or missed a previously determined instance of at least one of the one or more sub-goals.

14. A computer program product comprising a computer readable storage medium having program instructions embodied therewith, the program instructions executable by a processing circuit to cause the processing circuit to:
- query a plurality of model data from a distributed data source based at least in part on one or more user characteristics;
- gather a plurality of sensor data associated with a condition of a user;
- generate a policy comprising an end goal and one or more sub-goals based at least in part on the model data and the sensor data, wherein the policy is generated using machine learning that learns an action-state value function and uses backward induction to estimate the policy with a parametric regression model for intermediate stress level and participant physical activity pattern per stage for a plurality of stages;
- iteratively adapt the policy based at least in part on one or more detected changes in the sensor data collected over a period of time to adjust at least one of the one or more sub-goals, the iteratively adaption comprising:
  - determine a confidence level indicating a likelihood of meeting the end goal;
  - compare the confidence level to an acceptance threshold;
  - based at least in part on determining that the confidence level does not meet the acceptance threshold, search for a plurality of additional actions between a capability of the user and a plurality of model actions from the model data; and
  - based at least in part on determining that the confidence level meets the acceptance threshold, select the policy and the one or more sub-goals for display to the user; and
- provide the policy and the one or more sub-goals to the user in combination with an interpretation of the policy and the one or more sub-goals that explains why the one or more sub-goals have been selected and one or more impacts of adjustment of at least one of the one or more sub-goals.

15. The computer program product of claim 14, wherein the program instructions are further executable to cause the processing circuit to determine a plurality of behavioral patterns of the user based at least in part on the one or more user characteristics and the sensor data, wherein the one or more sub-goals comprise one or more personalized thresholds derived from the behavioral patterns.

16. The computer program product of claim 15, wherein the program instructions are further executable to cause the processing circuit to use a table lookup or statistical functional approximation to determine a sequence of decision rules based at least in part on the one or more sub-goals and the confidence level indicating the likelihood of meeting the end goal using the sequence of decision rules.

17. The computer program product of claim 16, wherein the program instructions are further executable to cause the processing circuit to:

prompt the user to perform one or more of the additional actions;

collect a plurality of additional user data based at least in part on performance of the one or more of the additional actions by the user; and further adapt the policy based at least in part on the additional user data.

18. The computer program product of claim 14, wherein iterative adaption of the policy comprises an updated evaluation of the sensor data collected over the period of time in combination with a plurality of previously collected instances of the sensor data using statistical and reinforcement learning to classify the one or more detected changes, and further wherein the policy is learned using a parametric regression model for a Q-function at each stage of a multiple stage analysis, and each stage has a different outcome goal.

19. The computer program product of claim 14, wherein the program instructions are further executable to cause the processing circuit to adjust at least one sub-goal based at least in part on detecting that the user has exceeded or missed a previously determined instance of at least one of the one or more sub-goals.

20. A computer-implemented method comprising:

generating, by a processor, a policy comprising an end goal and one or more sub-goals based at least in part on a plurality of model data and sensor data, wherein the policy is generated using machine learning that learns an action-state value function and uses backward induction to estimate the policy with a parametric regression model for intermediate stress level and participant physical activity pattern per stage for a plurality of stages;

providing the policy and the one or more sub-goals to a user;

receiving a policy adjustment request from a dialog system through a question answering interface that provides a natural language response to modify one or more aspects of the policy;

generating, by the processor, one or more projected policy variations of the policy based at least in part on the policy adjustment request, a condition of the user associated with the sensor data, and the model data in combination with an interpretation of the policy and the one or more sub-goals that explains why the one or more sub-goals have been selected and one or more impacts of adjustment of the one or more aspects of the policy;

capturing a plurality of different scenarios for the user in the one or more projected policy variations of the policy; and confirming, by the processor, a user selection of one of the one or more projected policy variations as an updated version of the policy.

21. The computer-implemented method of claim 20, wherein the policy adjustment request comprises an expected deviation in one or more user actions preventing at least one of the one or more sub-goals of the policy from being met.

22. The computer-implemented method of claim 20, wherein the one or more projected policy variations of the policy adjust at least one sub-goal to increase a confidence level of the end goal being met based at least in part on the policy adjustment request, the condition of the user associated with the sensor data, and the model data.

23. A system comprising:

a memory; and a processor coupled with the memory, the processor configured to:

generate a policy comprising an end goal and one or more sub-goals based at least in part on a plurality of model data and sensor data, wherein the policy is generated using machine learning that learns an action-state value function and uses backward induction to estimate the policy with a parametric regression model for intermediate stress level and participant physical activity pattern per stage for a plurality of stages;

provide the policy and the one or more sub-goals to a user;

receive a policy adjustment request from a dialog system through a question answering interface that provides a natural language response to modify one or more aspects of the policy;

generate one or more projected policy variations of the policy based at least in part on the policy adjustment request, a condition of the user associated with the sensor data, and the model data in combination with an interpretation of the policy and the one or more sub-goals that explains why the one or more sub-goals have been selected and one or more impacts of adjustment of the one or more aspects of the policy;

capture a plurality of different scenarios for the user in the one or more projected policy variations of the policy; and confirm a user selection of one of the one or more projected policy variations as an updated version of the policy.

24. The system of claim 23, wherein the policy adjustment request comprises an expected deviation in one or more user actions preventing at least one of the one or more sub-goals of the policy from being met.

25. The system of claim 23, wherein the one or more projected policy variations of the policy adjust at least one sub-goal to increase a confidence level of the end goal being met based at least in part on the policy adjustment request, the condition of the user associated with the sensor data, and the model data.

* * * * *